United States Patent Office 2,856,744
Patented Oct. 21, 1958

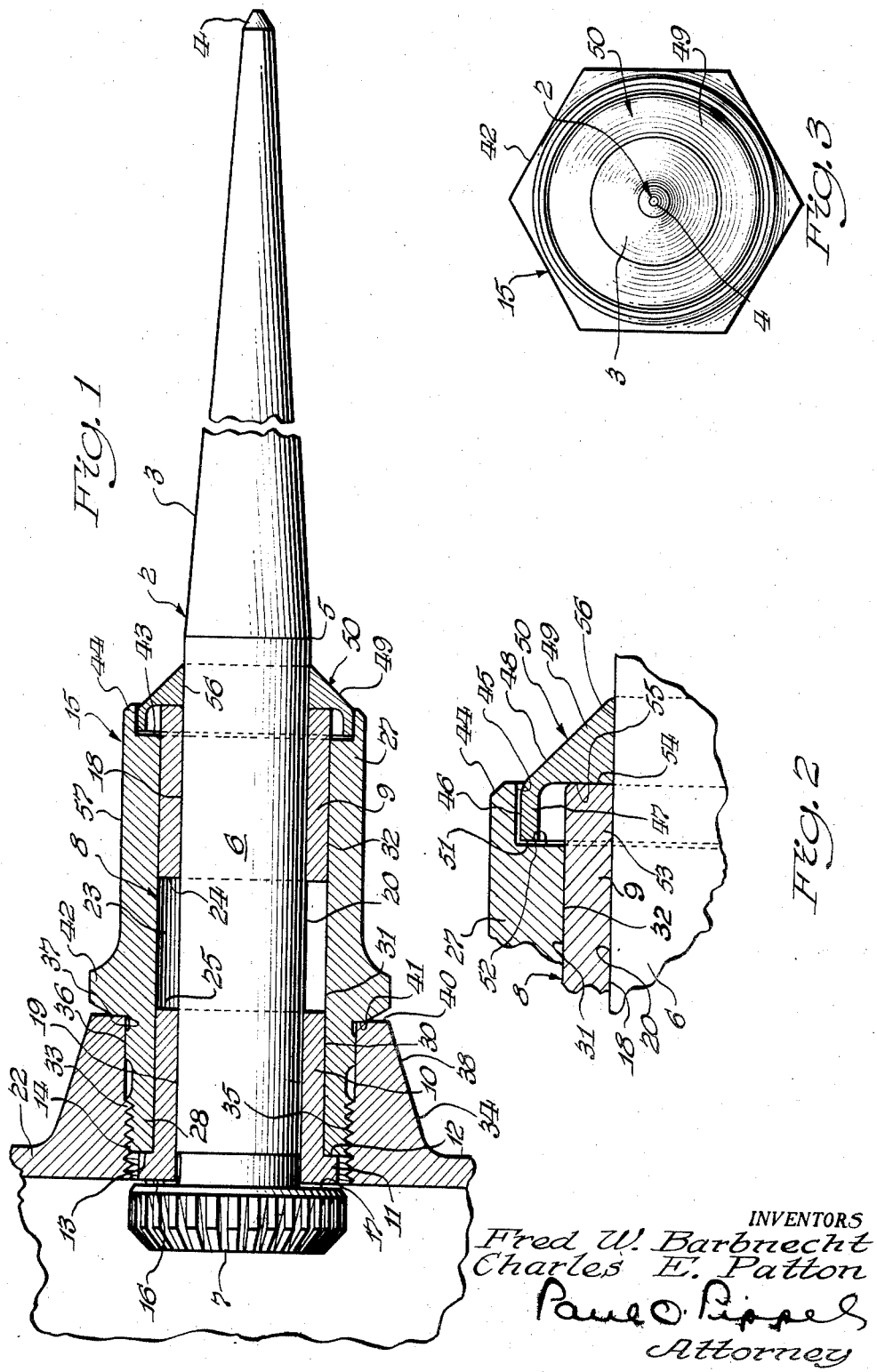

2,856,744

COTTON PICKING SPINDLE ASSEMBLY

Fred W. Barbknecht, Palos Heights, Ill., and Charles E. Patton, Memphis, Tenn., assignors to International Harvester Company, a corporation of New Jersey Application April 26, 1956, Serial No. 580,872

9 Claims. (Cl. 56—50)

This invention relates to cotton pickers of the revolving spindle type and more specifically to a shield structure for each of the spindles.

In cotton pickers of the type under consideration there are provided currently about 600 spindles which are arranged on vertical bars, the bars forming drums which are revolved to enter the spindle sequentially into the plant and then withdraw the cotton-laden spindles from the plant to a doffing station where the cotton is swept or otherwise stripped from the spindles, the drums revolving to re-enter the spindles into the plants in a continuing operation.

The constructions heretofore used caused winding or collection of cotton fibers over the spindle supports from the bars and more particularly on the nut structures which carry the spindles from the drums. These collections of cotton would be roped about the supports and become grease-ladened and oil stained and after an excessive accumulation would drop off into the clean cotton and stain it or become so thoroughly mixed with the clean cotton that purchasers would refuse to buy it or would down-grade it at great loss to the producer.

A general object of the invention is to provide a novel, simple and effective shield structure.

A further object of the invention is to provide a novel shield structure which provides an effective seal against the entry of dirt into the spindle-supporting bearings.

A more specific object of the invention is to provide a novel combination seal and spindle shield, the shield and support having a plurality of reentrant areas providing a tortuous passageway to prevent the entry of dirt into the spindle bearings.

These and other objects of the invention will become more apparent from the specification and the drawings wherein:

Figure 1 is a fragmentary elevational view, with parts broken away and shown in section, of a cotton picking spindle assembly.

Figure 2 is an enlarged view of a portion of the shield and nut structure shown in Figure 1, and Figure 3 is an end view taken from the outer end of the spindle.

Describing the invention in detail the cotton picker spindle generally designated 2 may be of conventional form including a tapered picker portion 3, which terminates to a pointed outer end 4 and a base end 5 of the picker portion which merges into a cylindrical journal portion 6 which at the inner end of the spindle is preferably formed integral with a driving gear 7, as will be readily understood by those skilled in the art.

The shank portion 6 is journaled within a bearing structure generally indicated 8, and said bearing structure in the present instance comprising forward and rear bearings 9 and 10 of cylindrical form, the inner bearing 10 having an out-turned radial inner end flange 11 which has an outer side 12 seating as at 13 against the inner end 14 of the nut structure generally designated 15. The flange 11 has an inner radial side 16 which is adapted for engagement by the outer side 17 of the generally radial bevel gear 7.

It will be understood that there is a running clearance between the internal cylindrical bore surfaces 18 and 19 and the outer periphery 20 of the journal portion 6 of the spindle and that this space that is the running clearance between 18, 19 and 20 and between the radial surfaces 16 and 17, is sufficient to admit oil from the interior of the support bar 22 of the drum structure from which the spindle is carried as more fully explained in U. S. Patent 2,140,631. The oil in such flush type lubrication migrates into the chamber 23 which is defined between the adjacent ends 24 and 25 of the outer and inner bearings 9 and 10 which are spaced axially with respect to the journal portion 6. The bearings 9 and 10 are press-fitted into the outer and inner end portions 27 and 28 of the nut structure 15 and more specifically the inner bearings has an outer cylindrical periphery 30 which fits into the bore 31 and the outer bearing 9 has its outer periphery 32 which fits with a press fit into the bore 31. It will be seen that the nut structure 15 has its inner end portion 14 externally threaded as at 33 which threads into the boss 34 as at 35. The nut 15 further has a cylindrical guide surface 36 which fits into a complementary bore 37 in the outer end portion 38 of the hub or boss 34.

The outer extremity of the hub portion 38 is provided with a radial abutment surface 40 which engages against a back side radial abutment surface 41 on a wrench-engaging hexagonal portion 42 formed on the nut member 15 intermediate its ends. The engagement between 40 and 41 serves to limit threading of the nut member 15 into the holder 34.

The outer end portion 27 of the nut member 15 has a substantially cylindrical contour outwardly from the portion 42 and at its outer extremity is provided with an annular slot or groove 43 which is defined by a peripheral annular flange 44 which is formed as an axial extension of the portion 27. The inner annular periphery 45 of the flange 44 is cylindrical and closely surrounds the outer periphery 46 of an annular flange or ring portion 47 which is formed about the outer edge 48 of a conical collar portion 49 of the shield generally designated 50.

The ring portion 47 of the shield is provided at its free inner edge with a radial flat edge surface 51 which opposes a radial surface 52 from which it is minutely spaced, the surface 52 forming the inner terminus of the groove 43 in the outer end portions 27 of the nut 15. It will be observed that the groove 43 is further defined by an outer end portion 53 of the outer bearing member 9 extending axially outwardly from the surface or face 52. The outer end surface 54 of the bearing 53 engages with a complementary radial bearing surface or radial face 55 on the back side of the conical central portion 49 of the shield member 50.

The shield member 50 has a central bore 56 in portion 49 which fits on the portion 6 as at 56 and is press-fitted thereon so that the spindle 2 is held against endwise displacement in the bearing and nut assembly between the gear 7 and the shield 50.

It will be observed that the rotating or the moving member of the shield is positioned within the stationary sleeve portion 15 and that the outer periphery 57 of the end portion 27 of the nut is cylindrical from end to end so that there is no possibility of lint catching and holding onto the sleeve. Furthermore, a labyrinthian seal is provided by the construction of the flange 47 and the groove 23 as well as the disposition of the bearing portion 53 and it will be observed that the dirt to enter into the running surface is required to turn many corners so that positive obstructions are provided against the free entry of the dirt. This cooperates with the flush type lubrication system as described in U. S. Patent 2,743,569 issued May 1, 1956, so that if any dirt does enter into any crook of the passage it will be flushed out.

This design has been actually tested and it is found to keep the nuts substantially clean of cotton accumulations thus eliminating the foregoing difficulties.

What is claimed is:

1. The combination of a nut and a bearing mounted therein and having a cylindrical bore, a cotton picking spindle having a journal portion rotatably mounted in said bore, said nut having an outer end portion with an axially directed flange supporting said spindle and spaced radially outwardly therefrom, said end portion having a radial end surface extending between said bearing and said flange, and said bearing extending outwardly of said end surface and having an outer end portion in generally radial alignment with said flange and spaced radially inwardly therefrom and forming therewith and with said end surface an outwardly open groove, and a shield member sleeved over said journal portion and having a mounting portion connected to said spindle and provided with a radial face in abutment with the end of said end portion of the bearing, said shield having an annular flange on said mounting portion extending into said groove.

2. The invention according to claim 1 and said last-mentioned flange being generally concentric with said first-mentioned flange and said bearing portion and having a flat edge disposed in opposing relationship to said end surface.

3. The combination of a support comprising a sleeve portion, said support having an internal bore, a cotton picker spindle, means journaling said spindle in said bore, said spindle extending outwardly from one end of said support, said sleeve having an outer end with an annular axial groove, and a shield having a collar portion sleeved on said spindle and connected thereto, and a peripheral flange on said collar portion extending axially of said spindle into said groove.

4. The invention according to claim 3 and said collar portion having an external conical surface and said flange having a generally cylindrical contour.

5. The invention according to claim 3 and said means comprising a cylindrical bearing in said bore and said sleeve portion having an inner periphery with a groove and having an outer end portion with a flange and said bearing having an end portion in radial alignment with said flange and therewith defining outer and inner radial edges of said groove.

6. The invention according to claim 5 and said end portion of the bearing having an outwardly facing radial face and said collar having a radial surface on said flange thereof opposing and proximate to said face.

7. A cotton picker spindle assembly comprising a spindle having a cylindrical journal portion and a picker portion, means for mounting the spindle from an associated support comprising a sleeve-like element having an internal bore, bearing means in said bore and having a portion extending outwardly of one end of said element and journaling said spindle via said journal portion thereof, an axially directed flange on said one end of said element and spaced radially outwardly of the bearing portion and defining an annular slot therewith open axially outwardly, and a shield member having a conical collar portion sleeved on said spindle and having a back side in abutment with the adjacent end of said bearing portion, and an axially directed flange on said collar portion projecting in to said groove and defining with said first-mentioned flange and bearing portion a labyrynthian seal against the entry of dirt into said bearing means.

8. The invention according to claim 7 and said element having a cylindrical outer end portion with a continuous cylindrical outer periphery.

9. A cotton picker spindle assembly comprising: a spindle support having a spindle receiving opening with an inner bearing surface and an annular recess in the outer end thereof; a rotatable spindle having its axis of rotation coincident with the bearing surface and having a shank portion journalled in the opening and a picking portion extending axially outwardly from one end of the support; a radially extending guard member fixed to the spindle proximate to said end of the support and having an axial annular flange directed inwardly of said support into said annular recess, and said guard member having a conical outer surface extending axially outward from said outer end of the support.

References Cited in the file of this patent

UNITED STATES PATENTS

| | | |
|---|---|---|
| 2,440,767 | Baker | May 4, 1948 |
| 2,497,776 | Kallgren | Feb. 14, 1950 |
| 2,669,828 | Hutchins, Jr. et al. | Feb. 23, 1954 |